United States Patent
Faitelson et al.

(10) Patent No.: US 9,275,061 B2
(45) Date of Patent: *Mar. 1, 2016

(54) AUTOMATIC RESOURCE OWNERSHIP ASSIGNMENT SYSTEM AND METHOD

(71) Applicant: VARONIS SYSTEMS, INC., New York, NY (US)

(72) Inventors: Yakov Faitelson, Elkana (IL); Ohad Korkus, Herzeliya (IL); Ophir Kretzer-Katzir, Reut (IL)

(73) Assignee: VARONIS SYSTEMS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/498,189

(22) Filed: Sep. 26, 2014

(65) Prior Publication Data
US 2015/0012572 A1 Jan. 8, 2015

Related U.S. Application Data

(60) Continuation of application No. 13/724,028, filed on Dec. 21, 2012, now Pat. No. 8,875,246, which is a division of application No. 13/106,023, filed on May 12, 2011, now Pat. No. 8,533,787.

(51) Int. Cl.
*G06F 21/60* (2013.01)
*G06F 17/30* (2006.01)
(Continued)

(52) U.S. Cl.
CPC .... *G06F 17/30091* (2013.01); *G06F 17/30082* (2013.01); *G06F 17/30115* (2013.01);
(Continued)

(58) Field of Classification Search
None
See application file for complete search history.

(56) References Cited

U.S. PATENT DOCUMENTS 5,465,387 A 11/1995 Mukherjee
5,729,734 A * 3/1998 Parker et al.
(Continued)

FOREIGN PATENT DOCUMENTS

CN 1588889 A 3/2005
EP 1248178 B1 10/2002
(Continued)

OTHER PUBLICATIONS

Sahadeb De, et al; "Secure Access Control in a Multi-user Geodatabase" available on the internet at the URL http://www10.giscafe.com.2005; 10 pages.

(Continued)

*Primary Examiner* — Minh Dinh
(74) *Attorney, Agent, or Firm* — Ladas & Parry LLP

(57) ABSTRACT

A method for automatic folder ownership assignment, including ascertaining which first folders, among a first multiplicity of folders, have at least one of modify and write permissions to non-IT administration entities, adding the first folders to a list of candidates for ownership assignment, defining a second multiplicity of folders which is a subset of the first multiplicity of folders and not including the first folders and descendents and ancestors thereof, ascertaining which second folders among the second multiplicity of folders, have permissions to non-IT administration entities, adding the second folders to the candidates, defining a third multiplicity of folders, which is a subset of the second multiplicity of folders and not including the second folders and descendents and ancestors thereof, ascertaining which third folders among the third multiplicity of folders are topmost folders, adding the third folders to the candidates, and recommending possible assignment of ownership of the candidates.

2 Claims, 3 Drawing Sheets

(51) Int. Cl.
*G06Q 10/10* (2012.01)
*H04L 29/06* (2006.01)

(52) U.S. Cl.
CPC .......... *G06F17/30194* (2013.01); *G06F 21/60* (2013.01); *G06F 21/604* (2013.01); *G06Q 10/10* (2013.01); *H04L 63/10* (2013.01)

(56) References Cited

U.S. PATENT DOCUMENTS

| | | | |
|---|---|---|---|
| 5,889,952 | A | 3/1999 | Hunnicutt et al. |
| 5,899,991 | A | 5/1999 | Karch |
| 6,308,173 | B1 | 10/2001 | Glasser et al. |
| 6,338,082 | B1 | 1/2002 | Schneider |
| 6,393,468 | B1 | 5/2002 | McGee |
| 6,772,350 | B1 | 8/2004 | Belani et al. |
| 6,928,439 | B2 | 8/2005 | Satoh |
| 7,017,183 | B1 | 3/2006 | Frey et al. |
| 7,031,984 | B2 | 4/2006 | Kawamura et al. |
| 7,068,592 | B1 | 6/2006 | Duvaut et al. |
| 7,305,562 | B1 | 12/2007 | Bianco et al. |
| 7,403,925 | B2 | 7/2008 | Schlesinger et al. |
| 7,421,740 | B2 | 9/2008 | Fey et al. |
| 7,555,482 | B2 | 6/2009 | Korkus |
| 7,606,801 | B2 | 10/2009 | Faitelson et al. |
| 7,716,240 | B2 | 5/2010 | Lim |
| 7,743,420 | B2 | 6/2010 | Shulman et al. |
| 8,533,787 | B2 | 9/2013 | Faitelson et al. |
| 8,805,884 | B2 | 8/2014 | Faitelson et al. |
| 8,875,246 | B2 | 10/2014 | Faitelson et al. |
| 8,875,248 | B2 | 10/2014 | Faitelson et al. |
| 2003/0048301 | A1 | 3/2003 | Menninger |
| 2003/0051026 | A1 | 3/2003 | Carter et al. |
| 2003/0231207 | A1 | 12/2003 | Huang |
| 2004/0030915 | A1 | 2/2004 | Sameshima et al. |
| 2004/0186809 | A1 | 9/2004 | Schlesinger et al. |
| 2004/0249847 | A1 | 12/2004 | Wang et al. |
| 2004/0254919 | A1 | 12/2004 | Giuseppini |
| 2005/0086268 | A1 | 4/2005 | Rogers |
| 2005/0086529 | A1 | 4/2005 | Buchsbaum |
| 2005/0108206 | A1 | 5/2005 | Lam et al. |
| 2005/0120054 | A1 | 6/2005 | Shulman et al. |
| 2005/0203881 | A1 | 9/2005 | Sakamoto et al. |
| 2005/0246762 | A1 | 11/2005 | Girouard et al. |
| 2005/0278334 | A1 | 12/2005 | Fey et al. |
| 2006/0064313 | A1 | 3/2006 | Steinbarth et al. |
| 2006/0184459 | A1 | 8/2006 | Parida |
| 2006/0184530 | A1 | 8/2006 | Song et al. |
| 2006/0277184 | A1 | 12/2006 | Faitelson et al. |
| 2007/0027872 | A1 | 2/2007 | Johnson et al. |
| 2007/0061487 | A1 | 3/2007 | Moore et al. |
| 2007/0073698 | A1 | 3/2007 | Kanayama et al. |
| 2007/0094265 | A1 | 4/2007 | Korkus |
| 2007/0101387 | A1 | 5/2007 | Hua et al. |
| 2007/0112743 | A1 | 5/2007 | Giampaolo et al. |
| 2007/0143859 | A1* | 6/2007 | Ogi et al. ........................ 726/27 |
| 2007/0156659 | A1 | 7/2007 | Lim |
| 2007/0156693 | A1 | 7/2007 | Soin et al. |
| 2007/0203872 | A1 | 8/2007 | Flinn et al. |
| 2007/0244899 | A1 | 10/2007 | Faitelson et al. |
| 2007/0266006 | A1 | 11/2007 | Buss |
| 2007/0282855 | A1 | 12/2007 | Chen et al. |
| 2008/0034402 | A1 | 2/2008 | Botz et al. |
| 2008/0162707 | A1 | 7/2008 | Beck et al. |
| 2008/0172720 | A1 | 7/2008 | Botz et al. |
| 2008/0270462 | A1 | 10/2008 | Thomsen |
| 2008/0271157 | A1 | 10/2008 | Faitelson et al. |
| 2009/0100058 | A1 | 4/2009 | Faitelson et al. |
| 2009/0119298 | A1 | 5/2009 | Faitelson et al. |
| 2009/0150981 | A1 | 6/2009 | Amies et al. |
| 2009/0198892 | A1 | 8/2009 | Alvarez et al. |
| 2009/0249446 | A1 | 10/2009 | Jenkins et al. |
| 2009/0265780 | A1 | 10/2009 | Korkus et al. |
| 2009/0320088 | A1 | 12/2009 | Gill et al. |
| 2010/0037324 | A1 | 2/2010 | Grant et al. |
| 2010/0070881 | A1 | 3/2010 | Hanson et al. |
| 2010/0262625 | A1 | 10/2010 | Pittenger |
| 2011/0010758 | A1 | 1/2011 | Faitelson et al. |
| 2011/0060916 | A1 | 3/2011 | Faitelson et al. |
| 2011/0061111 | A1 | 3/2011 | Faitelson et al. |
| 2011/0184989 | A1 | 7/2011 | Faitelson et al. |
| 2012/0221550 | A1 | 8/2012 | Korkus et al. |
| 2012/0291100 | A1 | 11/2012 | Faitelson et al. |
| 2013/0017314 | A1 | 1/2013 | Yang et al. |
| 2013/0117315 | A1 | 5/2013 | Faitelson et al. |
| 2014/0006453 | A1 | 1/2014 | Faitelson et al. |
| 2015/0012573 | A1 | 1/2015 | Faitelson et al. |

FOREIGN PATENT DOCUMENTS

| | | |
|---|---|---|
| JP | 2005-267237 A | 9/2005 |
| JP | 2010-287171 A | 12/2010 |
| WO | 2011/030324 A1 | 3/2011 |

OTHER PUBLICATIONS

Varonis; "Entitlement Reviews: A Practitioner's Guide", 2007, 16 pages.
Findutils-GNU Project-Free Software Foundation (FSF), 3 pages, Nov. 2006.
S.R. Kleiman; "Vnodes: An Architecture for Multiple File System Types in Sun UNIX", USENIX Association: Summer Conference Proceedings, Atlanta 1986, 10 pages.
Sara C. Madeira, et al; "Biclustering Algorithms for Biological Data Analysis: A Survey", IEEE Transactions on Computational Biology and Bioinformatics, vol. 1, No. 1, Jan.-Mar. 2004, 22 pages; http://www.cs.princeton.edu/courses/archive/spr05/cos598E/bib/bicluster.pdf.
Sara C. Madeira; Clustering, Fuzzy Clustering and Biclustering: An Overview; pp. 31-53, Jun. 27, 2003.
Edgar Weippl, et al; "Content-based Management of Document Access Control" 14th International Conference on Application of Prolog (INAP), 2001, 9 pages.
Alex Woodie; "Varonis Prevents Unauthorized Access to Unstructured Data", Four Hundred Stuff, vol. 7, No. 29; Jul. 31, 2007; 4 pages.
Genunix; "Writing Filesystems—VFS and Vnode Interfaces", Oct. 2007, 5 pages.
Varonis; The Business Case for Data Governance; dated Mar. 27, 2007; 8 pages.
DatAdvantage User Guide by Varonis, Version 1.0, Aug. 30, 2005, 71 pages.
DatAdvantage User Guide by Varonis, Version 2.0, Aug. 24, 2006, 118 pages.
DatAdvantage User Guide by Varonis, Version 2.5, Nov. 27, 2006, 124 pages.
DatAdvantage User Guide by Varonis, Version 2.6, Dec. 15, 2006, 127 pages.
DatAdvantage User Guide by Varonis, Version 2.7, Feb. 6, 2007, 131 pages.
DatAdvantage User Guide by Varonis, Version 3.0, Jun. 20, 2007, 153 pages.
A List of Database Tables in DatAdvantage 2.7, Feb. 6, 2007 1 page by Varonis.
A List of Database Tables in DatAdvantages 3.0, Jun. 20, 2007 1 page by Varonis.
Varonis; "Accelerating Audits with Automation: Understanding Who's Accessing Your Unstructured Data" Oct. 8, 2007; 7 pages.
German Office Action dated Sep. 14, 2012 which issued during the prosecutioin of German Patent Application No. 11 2006 001 378.5.
International Preliminary Report on Patentability dated Jul. 30, 2013; PCT/IL2011/000902.
International Preliminary Report on Patentability dared Jul. 30, 2013; PCT/IL2011/000903.
International Search Report and Written Opinion dated May 23, 2011; PCT/IL11/00065.
International Search Report and Written Opinion dated May 20, 2010; PCT/IL10/00069.

(56) References Cited

OTHER PUBLICATIONS

International Search Report and Written Opinion dated May 24, 2011; PCT/IL11/00077.
International Search Report and Written Opinion dated Nov. 15, 2011; PCT/IL11/00408.
International Search Report and Written Opinion dated Apr. 13, 2012; PCT/IL11/00902.
U.S. Appl. No. 60/688,486, filed Jun. 7, 2005.
U.S. Appl. No. 61/240,726, filed Sep. 9, 2009.
USPTO NFOA mailed Feb. 12, 2008 in connection with U.S. Appl. No. 11/258,256.
USPTO FOA mailed Aug. 1, 2008 in connection with U.S. Appl. No. 11/258,256.
USPTO NFOA mailed Oct. 31, 2008 in connection with U.S. Appl. No. 11/635,736.
USPTO NFOA mailed Dec. 14, 2010 in connection with U.S. Appl. No. 11/786,522.
USPTO NFOA mailed Jul. 9, 2010 in connection with U.S. Appl. No. 11/789,884.
USPTO FOA mailed Dec. 14, 2010 in connection with U.S. Appl. No. 11/789,884.
USPTO NFOA dated Sep. 16, 2010 in connection with U.S. Appl. No. 11/871.028.
USPTO FOA dated Apr. 28, 2011 in connection with U.S. Appl. No. 11/871,028.
USPTO NFOA dated Sep. 14, 2012 in connection with U.S. Appl. No. 12/861,967.
USPTO NFOA dated Jul. 11, 2012 in connection with U.S. Appl. No. 13/014,762.
USPTO FOA dated Feb. 14, 2013 in connection with U.S. Appl. No. 13/014,762.
USPTO AA dated Aug. 30, 2013 in connection with U.S. Appl. No. 13/014,762.
USPTO NFOA dated Dec. 16, 2013 in connection with U.S. Appl. No. 13/014,762.
USPTO NOA mailed Mar. 28, 2014 in connection with U.S. Appl. No. 13/014,762.
USPTO RR dated Nov. 21, 2012 in connection with U.S. Appl. No. 13/106,023.
USPTO NFOA dated Mar. 1, 2013 in connection with U.S. Appl. No. 13/106,023.
USPTO NOA mailed May 15, 2013 in connection with U.S. Appl. No. 13/106,023.
USPTO FOA dated Mar. 25, 2013 in connection with U.S. Appl. No. 13/303,826.
USPTO FOA dated Sep. 6, 2013 in connection with U.S. Appl. No. 13/378,115.
USPTO NFOA dated May 8, 2014 in connection with U.S. Appl. No. 13/724.028.
USPTO NOA mailed Aug. 19, 2014 in connection with U.S. Appl. No. 13/724,028.
USPTO NFOA dated Feb. 6, 2015 in connection with U.S. Appl. No. 13/724,121.
USPTO NOA mailed May 22, 2015 in connection with U.S. Appl. No. 13/724,121.
USPTO NFOA dated May 14, 2014 in connection with U.S. Appl. No. 14/018,835.
USPTO NOA mailed Aug. 21, 2014 in connection with U.S. Appl. No. 14/018,835.
USPTO NFOA dated Apr. 10, 2015 in connectin with U.S. Appl. No. 14/456,373.
USPTO NFOA dated Jun. 5, 2015 in connection with U.S. Appl. No. 14/498,373.

* cited by examiner

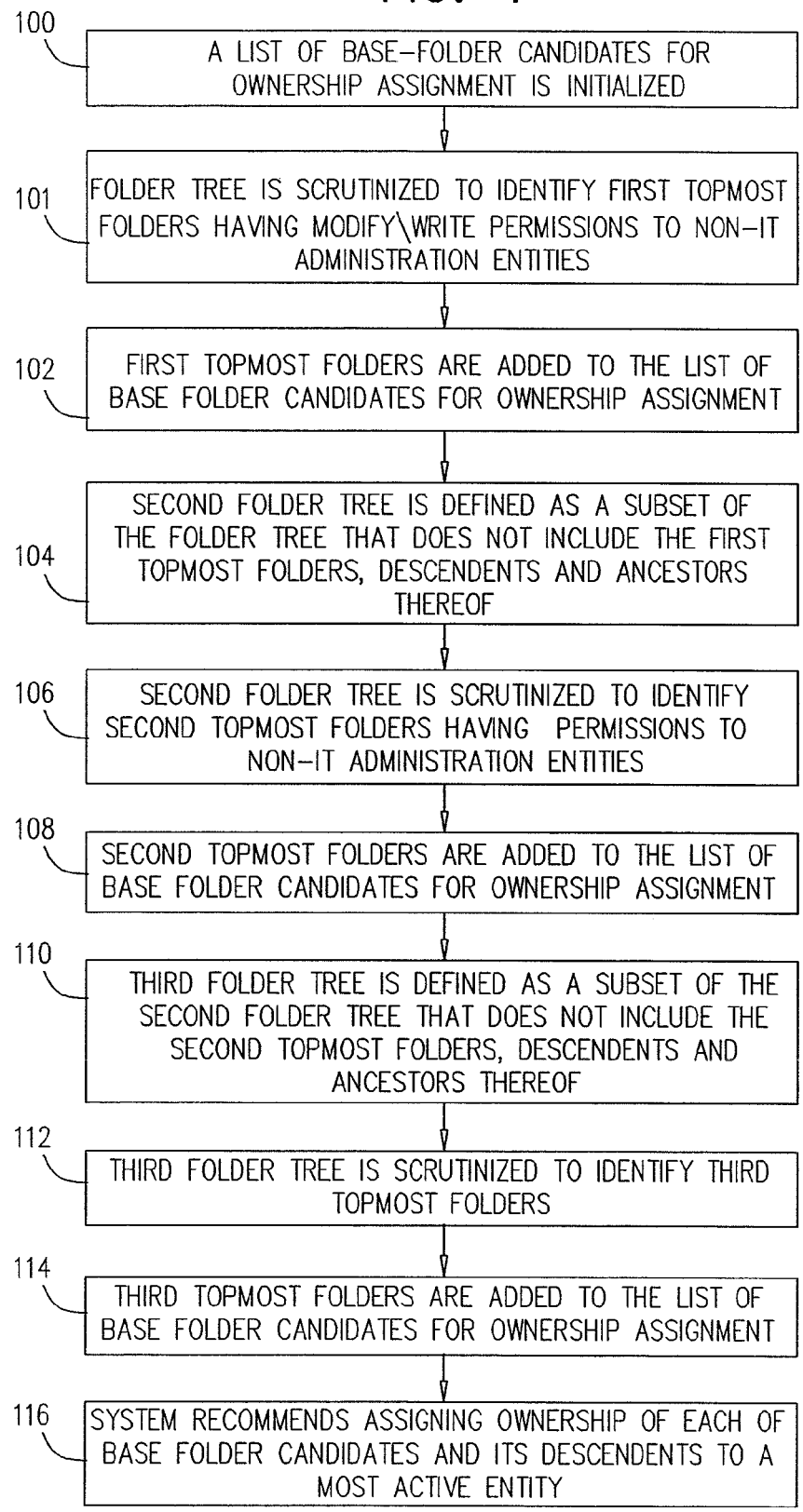

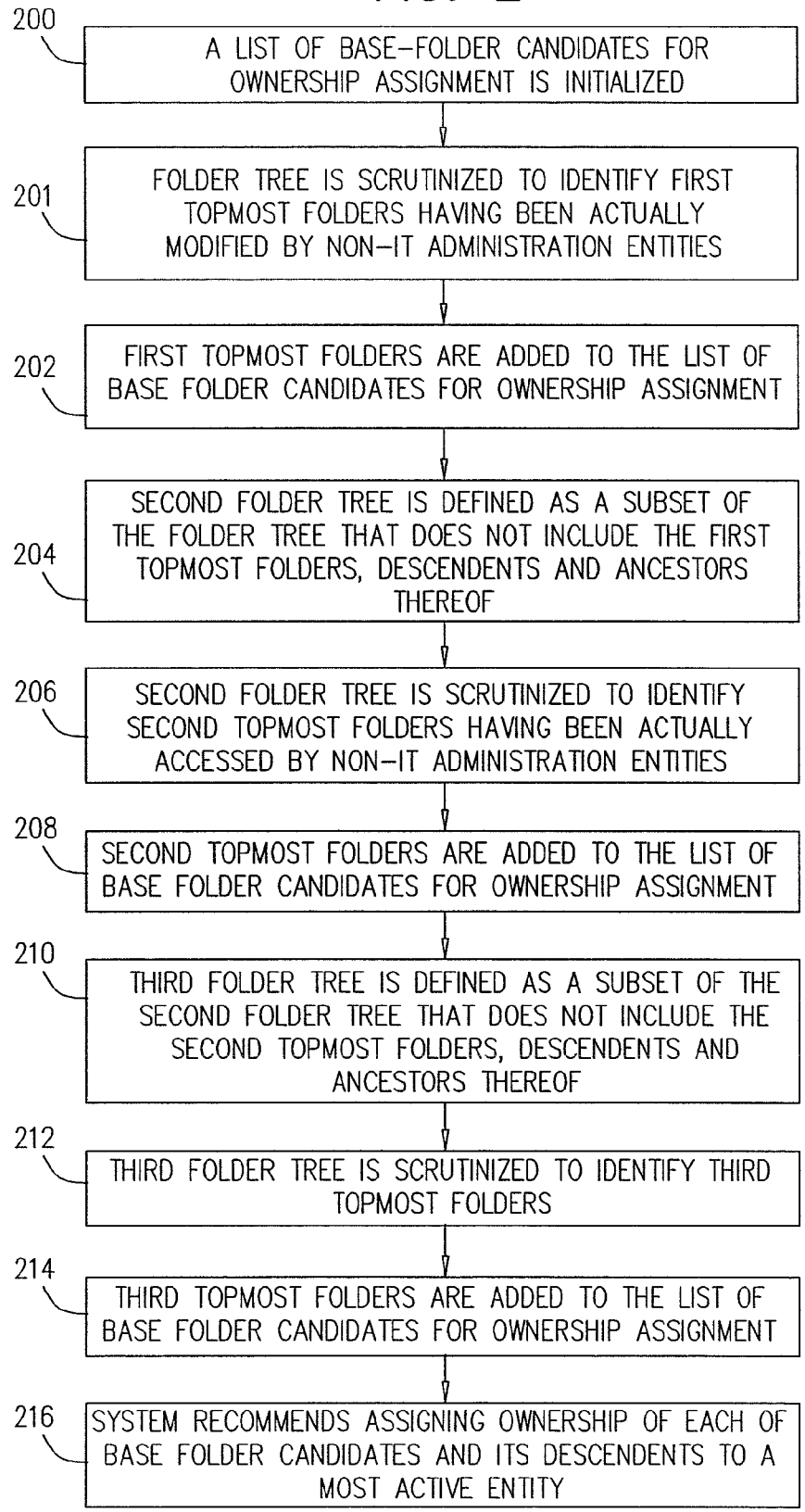

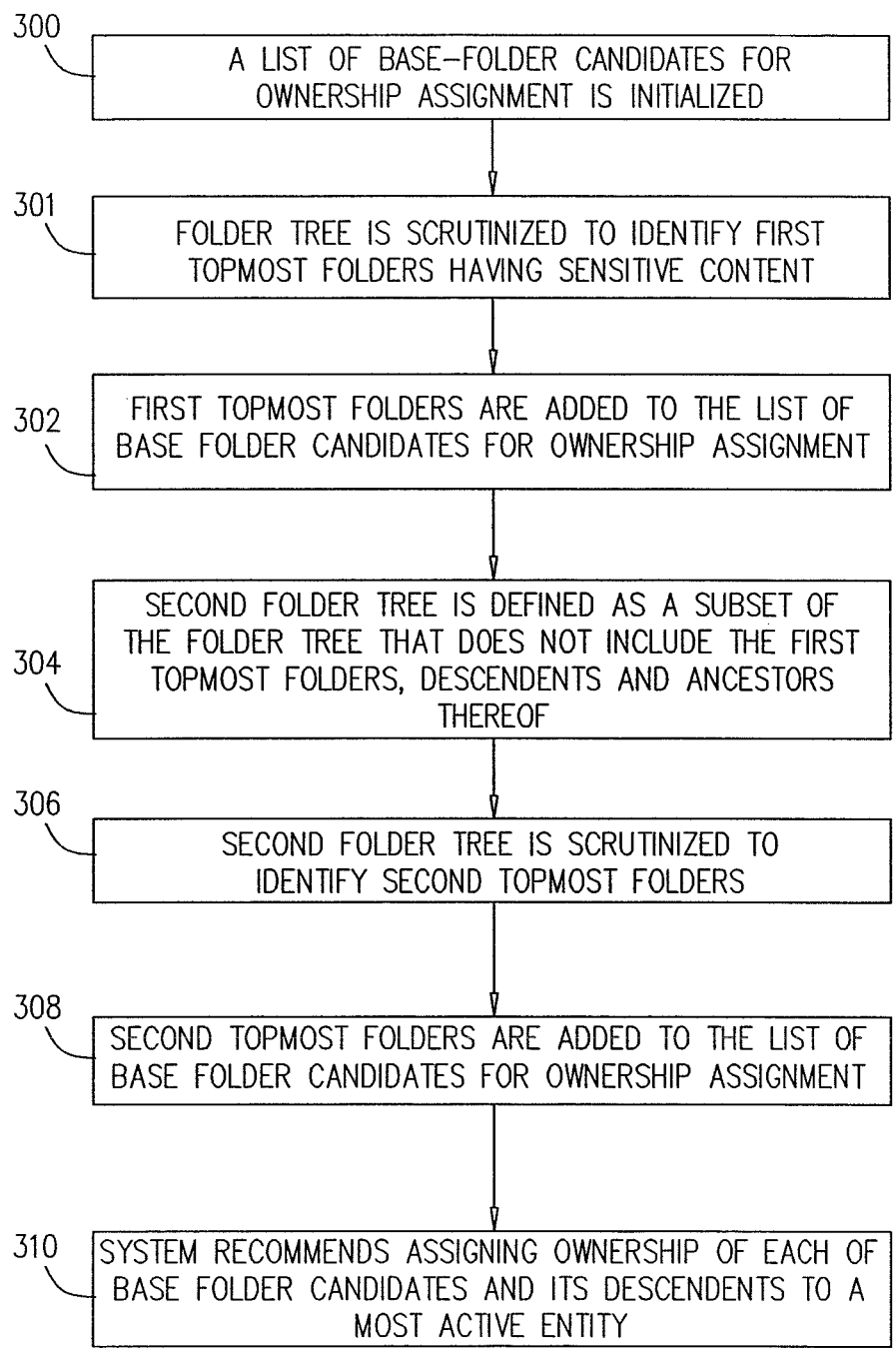

AUTOMATIC RESOURCE OWNERSHIP ASSIGNMENT SYSTEM AND METHOD

REFERENCE TO RELATED APPLICATIONS

Reference is made to U.S. patent application Ser. No. 13/014,762, filed Jan. 27, 2011, and entitled "AUTOMATIC RESOURCE OWNERSHIP ASSIGNMENT SYSTEMS AND METHODS", the disclosure of which is hereby incorporated by reference and priority of which is hereby claimed pursuant to 37 CFR 1.78(a) (1) and (2)(i).

Reference is also made to the following patents and patent applications, owned by assignee, the disclosures of which are hereby incorporated by reference:

U.S. Pat. Nos. 7,555,482 and 7,606,801;

U.S. Published Patent Application Nos. 2007/0244899, 2008/0271157, 2009/0100058, 2009/0119298; 2009/0265780; 2011/0060916 and 2011/0061111; and U.S. patent application Ser. No. 12/673,691.

FIELD OF THE INVENTION

The present invention relates to automatic resource ownership assignment systems and methods.

BACKGROUND OF THE INVENTION

The following patent publications are believed to represent the current state of the art:

U.S. Pat. Nos. 5,465,387; 5,899,991; 6,338,082; 6,393,468; 6,928,439; 7,031,984; 7,068,592; 7,403,925; 7,421,740; 7,555,482, 7,606,801 and 7,743,420; and U.S. Published Patent Application Nos.: 2003/0051026; 2004/0249847; 2005/0108206; 2005/0203881; 2005/0086529; 2006/0064313; 2006/0184530; 2006/0184459; 2007/0203872; 2007/0244899; 2008/0271157; 2009/0100058; 2009/0119298 and 2009/0265780.

SUMMARY OF THE INVENTION

The present invention provides improved systems and methodologies for automatic resource ownership assignment.

There is thus provided in accordance with a preferred embodiment of the present invention a system for automatic folder ownership assignment in an enterprise computer network, the system including modify/write permissions scrutinizing functionality operative for ascertaining which first folders, among a first multiplicity of folders in an enterprise computer network, have at least one of modify and write permissions to entities other than IT administration entities, and adding the first folders to a list of base-folder candidates for ownership assignment, first pruning functionality operative for defining a second multiplicity of folders, the second multiplicity of folders being a subset of the first multiplicity of folders which does not include the first folders, all descendents of the first folders and all ancestors of the first folders, permissions scrutinizing functionality operative for ascertaining which second folders among the second multiplicity of folders, have permissions to entities other than IT administration entities and adding the second folders to the list of base-folder candidates for ownership assignment, second pruning functionality operative for defining a third multiplicity of folders, the third multiplicity of folders being a subset of the second multiplicity of folders which does not include the second folders, all descendents of the second folders and all ancestors of the second folders, topmost folder scrutinizing functionality operative for ascertaining which third folders among the third multiplicity of folders are topmost folders and adding the third folders to the list of base-folder candidates for ownership assignment, and possible ownership assignment recommendation functionality operative for recommending possible assignment of ownership of at least one of the list of base-folder candidates.

Preferably, the possible ownership assignment recommendation functionality includes functionality operative for recommending possible assignment of ownership of at least one of the list of base-folder candidates to an entity which has been most active with regard to the at least one of the list of base-folder candidates.

Preferably, the modify/write permissions scrutinizing functionality is also operative for ascertaining which first additional folders, among the first multiplicity of folders in the enterprise computer network include at least sensitive content, and adding the first additional folders to the list of base-folder candidates for ownership assignment. Additionally or alternatively, the permissions scrutinizing functionality is also operative for ascertaining which second additional folders among the second multiplicity of folders include at least sensitive content, and adding the second additional folders to the list of base-folder candidates for ownership assignment.

There is also provided in accordance with another preferred embodiment of the present invention a system for automatic folder ownership assignment in an enterprise computer network, the system including modify/write permissions scrutinizing functionality operative for ascertaining which first folders, among a first multiplicity of folders in an enterprise computer network, have at least one of modify and write permissions to entities other than IT administration entities and include at least sensitive content, and adding the first folders to a list of base-folder candidates for ownership assignment, first pruning functionality operative for defining a second multiplicity of folders, the second multiplicity of folders being a subset of the first multiplicity of folders which does not include the first folders, all descendents of the first folders and all ancestors of the first folders, permissions scrutinizing functionality operative for ascertaining which second folders among the second multiplicity of folders, have permissions to entities other than IT administration entities and include at least sensitive content, and adding the second folders to the list of base-folder candidates for ownership assignment, second pruning functionality operative for defining a third multiplicity of folders, the third multiplicity of folders being a subset of the second multiplicity of folders which does not include the second folders, all descendents of the second folders and all ancestors of the second folders, topmost folder scrutinizing functionality operative for ascertaining which third folders among the third multiplicity of folders are topmost folders and adding the third folders to the list of base-folder candidates for ownership assignment, and possible ownership assignment recommendation functionality operative for recommending possible assignment of ownership of at least one of the list of base-folder candidates.

Preferably, the possible ownership assignment recommendation functionality includes functionality operative for recommending possible assignment of ownership of at least one of the list of base-folder candidates to an entity which has been most active with regard to the at least one of the list of base-folder candidates.

There is further provided in accordance with yet another preferred embodiment of the present invention a system for automatic folder ownership assignment in an enterprise computer network, the system including actual modification scrutinizing functionality operative for ascertaining which first folders, among a first multiplicity of folders in an enterprise computer network, have been at least actually modified by entities other than IT administration entities, and adding the first folders to a list of base-folder candidates for ownership assignment, first pruning functionality operative for defining a second multiplicity of folders, the second multiplicity of folders being a subset of the first multiplicity of folders which does not include the first folders, all descendents of the first folders and all ancestors of the first folders, actual access scrutinizing functionality operative for ascertaining which second folders among the second multiplicity of folders, have been at least actually accessed by entities other than IT administration entities and adding the second folders to the list of base-folder candidates for ownership assignment, second pruning functionality operative for defining a third multiplicity of folders, the third multiplicity of folders being a subset of the second multiplicity of folders which does not include the second folders, all descendents of the second folders and all ancestors of the second folders, topmost folder scrutinizing functionality operative for ascertaining which third folders among the third multiplicity of folders are topmost folders and adding the third folders to the list of base-folder candidates for ownership assignment, and possible ownership assignment recommendation functionality operative for recommending possible assignment of ownership of at least one of the list of base-folder candidates.

Preferably, the possible ownership assignment recommendation functionality includes functionality operative for recommending possible assignment of ownership of at least one of the list of base-folder candidates to an entity which has been most active with regard to the at least one of the list of base-folder candidates.

Preferably, the actual modification scrutinizing functionality is also operative for ascertaining which first additional folders, among the first multiplicity of folders in the enterprise computer network include at least sensitive content, and adding the first additional folders to the list of base-folder candidates for ownership assignment. Additionally or alternatively, the actual access scrutinizing functionality is also operative for ascertaining which second additional folders among the second multiplicity of folders include at least sensitive content, and adding the second additional folders to the list of base-folder candidates for ownership assignment.

There is further provided in accordance with yet another preferred embodiment of the present invention a system for automatic folder ownership assignment in an enterprise computer network, the system including actual modification scrutinizing functionality operative for ascertaining which first folders, among a first multiplicity of folders in an enterprise computer network, have been at least actually modified by entities other than IT administration entities and include at least sensitive content, and adding the first folders to a list of base-folder candidates for ownership assignment, first pruning functionality operative for defining a second multiplicity of folders, the second multiplicity of folders being a subset of the first multiplicity of folders which does not include the first folders, all descendents of the first folders and all ancestors of the first folders, actual access scrutinizing functionality operative for ascertaining which second folders among the second multiplicity of folders, have been at least actually accessed by entities other than IT administration entities and include at least sensitive content, and adding the second folders to the list of base-folder candidates for ownership assignment, second pruning functionality operative for defining a third multiplicity of folders, the third multiplicity of folders being a subset of the second multiplicity of folders which does not include the second folders, all descendents of the second folders and all ancestors of the second folders, topmost folder scrutinizing functionality operative for ascertaining which third folders among the third multiplicity of folders are topmost folders and adding the third folders to the list of base-folder candidates for ownership assignment, and possible ownership assignment recommendation functionality operative for recommending possible assignment of ownership of at least one of the list of base-folder candidates.

Preferably, the possible ownership assignment recommendation functionality includes functionality operative for recommending possible assignment of ownership of at least one of the list of base-folder candidates to an entity which has been most active with regard to the at least one of the list of base-folder candidates.

There is further provided in accordance with yet another preferred embodiment of the present invention a system for automatic folder ownership assignment in an enterprise computer network, the system including sensitive content scrutinizing functionality operative for ascertaining which first folders, among a first multiplicity of folders in an enterprise computer network, include at least sensitive content, and adding the first folders to a list of base-folder candidates for ownership assignment, first pruning functionality operative for defining a second multiplicity of folders, the second multiplicity of folders being a subset of the first multiplicity of folders which does not include the first folders, all descendents of the first folders and all ancestors of the first folders, topmost folder scrutinizing functionality operative for ascertaining which second folders among the second multiplicity of folders are topmost folders and adding the second folders to the list of base-folder candidates for ownership assignment, and possible ownership assignment recommendation functionality operative for recommending possible assignment of ownership of at least one of the list of base-folder candidates.

Preferably, the possible ownership assignment recommendation functionality includes functionality operative for recommending possible assignment of ownership of at least one of the list of base-folder candidates to an entity which has been most active with regard to the at least one of the list of base-folder candidates.

There is yet further provided in accordance with still another preferred embodiment of the present invention a method for automatic folder ownership assignment in an enterprise computer network, the method including maintaining a list of base-folder candidates for ownership assignment, ascertaining which first folders, among a first multiplicity of folders in an enterprise computer network, have at least one of modify and write permissions to entities other than IT administration entities, and adding the first folders to the list of base-folder candidates for ownership assignment, defining a second multiplicity of folders, the second multiplicity of folders being a subset of the first multiplicity of folders which does not include the first folders, all descendents of the first folders and all ancestors of the first folders, ascertaining which second folders among the second multiplicity of folders, have permissions to entities other than IT administration entities and adding the second folders to the list of base-folder candidates for ownership assignment, defining a third multiplicity of folders, the third multiplicity of folders being a subset of the second multiplicity of folders which does not include the second folders, all descendents of the second folders and all ancestors of the second folders, ascertaining which third folders among the third multiplicity of folders are topmost folders and adding the third folders to the list of base-folder candidates for ownership assignment, and recommending possible assignment of ownership of at least one of the list of base-folder candidates.

Preferably, the recommending includes recommending possible assignment of ownership of at least one of the list of base-folder candidates to an entity which has been most active with regard to the at least one of the list of base-folder candidates.

Preferably, the method also includes ascertaining which first additional folders, among the first multiplicity of folders in the enterprise computer network include at least sensitive content, and adding the first additional folders to the list of base-folder candidates for ownership assignment. Additionally or alternatively, the method also includes ascertaining which second additional folders among the second multiplicity of folders include at least sensitive content, and adding the second additional folders to the list of base-folder candidates for ownership assignment.

There is also provided in accordance with another preferred embodiment of the present invention a method for automatic folder ownership assignment in an enterprise computer network, the method including maintaining a list of base-folder candidates for ownership assignment, ascertaining which first folders, among a first multiplicity of folders in an enterprise computer network, have at least one of modify and write permissions to entities other than IT administration entities and include at least sensitive content, and adding the first folders to the list of base-folder candidates for ownership assignment, defining a second multiplicity of folders, the second multiplicity of folders being a subset of the first multiplicity of folders which does not include the first folders, all descendents of the first folders and all ancestors of the first folders, ascertaining which second folders among the second multiplicity of folders, have permissions to entities other than IT administration entities and include at least sensitive content, and adding the second folders to the list of base-folder candidates for ownership assignment, defining a third multiplicity of folders, the third multiplicity of folders being a subset of the second multiplicity of folders which does not include the second folders, all descendents of the second folders and all ancestors of the second folders, ascertaining which third folders among the third multiplicity of folders are topmost folders and adding the third folders to the list of base-folder candidates for ownership assignment, and recommending possible assignment of ownership of at least one of the list of base-folder candidates.

Preferably, the recommending includes recommending possible assignment of ownership of at least one of the list of base-folder candidates to an entity which has been most active with regard to the at least one of the list of base-folder candidates.

There is further provided in accordance with yet another preferred embodiment of the present invention a method for automatic folder ownership assignment in an enterprise computer network, the method including maintaining a list of base-folder candidates for ownership assignment, ascertaining which first folders, among a first multiplicity of folders in an enterprise computer network, have been at least actually modified by entities other than IT administration entities, and adding the first folders to the list of base-folder candidates for ownership assignment, defining a second multiplicity of folders, the second multiplicity of folders being a subset of the first multiplicity of folders which does not include the first folders, all descendents of the first folders and all ancestors of the first folders, ascertaining which second folders among the second multiplicity of folders, have been at least actually accessed by entities other than IT administration entities and adding the second folders to the list of base-folder candidates for ownership assignment, defining a third multiplicity of folders, the third multiplicity of folders being a subset of the second multiplicity of folders which does not include the second folders, all descendents of the second folders and all ancestors of the second folders, ascertaining which third folders among the third multiplicity of folders are topmost folders and adding the third folders to the list of base-folder candidates for ownership assignment, and recommending possible assignment of ownership of at least one of the list of base-folder candidates.

Preferably, the recommending includes recommending possible assignment of ownership of at least one of the list of base-folder candidates to an entity which has been most active with regard to the at least one of the list of base-folder candidates.

Preferably, the method also includes ascertaining which first additional folders, among the first multiplicity of folders in the enterprise computer network include at least sensitive content, and adding the first additional folders to the list of base-folder candidates for ownership assignment. Additionally or alternatively, the method also includes ascertaining which second additional folders among the second multiplicity of folders include at least sensitive content, and adding the second additional folders to the list of base-folder candidates for ownership assignment.

There is yet further provided in accordance with still another preferred embodiment of the present invention a method for automatic folder ownership assignment in an enterprise computer network, the method including maintaining a list of base-folder candidates for ownership assignment, ascertaining which first folders, among a first multiplicity of folders in an enterprise computer network, have been at least actually modified by entities other than IT administration entities and include at least sensitive content, and adding the first folders to the list of base-folder candidates for ownership assignment, defining a second multiplicity of folders, the second multiplicity of folders being a subset of the first multiplicity of folders which does not include the first folders, all descendents of the first folders and all ancestors of the first folders, ascertaining which second folders among the second multiplicity of folders, have been at least actually accessed by entities other than IT administration entities and include at least sensitive content, and adding the second folders to the list of base-folder candidates for ownership assignment, defining a third multiplicity of folders, the third multiplicity of folders being a subset of the second multiplicity of folders which does not include the second folders, all descendents of the second folders and all ancestors of the second folders, ascertaining which third folders among the third multiplicity of folders are topmost folders and adding the third folders to the list of base-folder candidates for ownership assignment, and recommending possible assignment of ownership of at least one of the list of base-folder candidates.

Preferably, the recommending includes recommending possible assignment of ownership of at least one of the list of base-folder candidates to an entity which has been most active with regard to the at least one of the list of base-folder candidates.

There is yet further provided in accordance with still another preferred embodiment of the present invention a method for automatic folder ownership assignment in an enterprise computer network, the method including maintaining a list of base-folder candidates for ownership assignment, ascertaining which first folders, among a first multiplicity of folders in an enterprise computer network, include at least sensitive content, and adding the first folders to the list of base-folder candidates for ownership assignment, defining a second multiplicity of folders, the second multiplicity of folders being a subset of the first multiplicity of folders which does not include the first folders, all descendents of the first folders and all ancestors of the first folders, ascertaining which second folders among the second multiplicity of folders are topmost folders and adding the second folders to the list of base-folder candidates for ownership assignment, and recommending possible assignment of ownership of at least one of the list of base-folder candidates.

Preferably, the recommending includes recommending possible assignment of ownership of at least one of the list of base-folder candidates to an entity which has been most active with regard to the at least one of the list of base-folder candidates.

BRIEF DESCRIPTION OF THE DRAWINGS

The present invention will be understood and appreciated more fully from the following detailed description, taken in conjunction with the drawings in which:

FIG. 1 is a simplified flowchart indicating steps in the operation of a system for automatic resource ownership assignment, constructed and operative in accordance with a preferred embodiment of the present invention;

FIG. 2 is a simplified flowchart indicating steps in the operation of a system for automatic resource ownership assignment, constructed and operative in accordance with another preferred embodiment of the present invention; and FIG. 3 is a simplified flowchart indicating steps in the operation of a system for automatic resource ownership assignment, constructed and operative in accordance with yet another preferred embodiment of the present invention.

DETAILED DESCRIPTION OF PREFERRED EMBODIMENTS

Reference is made to FIG. 1, which is a simplified flowchart indicating steps in the operation of a system for automatic resource ownership assignment, constructed and operative in accordance with a preferred embodiment of the present invention.

The term "ownership" is used throughout to designate authority and accountability within an enterprise as distinct to legal ownership in the normal sense of the word. "Ownership" of a data element, an organization function, a resource, whether IT related or not, a service, a workflow or any other element in an enterprise designates authority and accountability with respect thereto within the enterprise. The definitions of "owner" and "owning" are of corresponding meaning.

The automatic folder ownership assignment system of FIG. 1 is preferably suitable for operating in an enterprise computer network including multiple disparate clients, data storage elements, computer hardware resources and computer software resources. The system preferably resides on a computer server connected to the enterprise computer network, and includes modify/write permissions scrutinizing functionality, first pruning functionality, permissions scrutinizing functionality, second pruning functionality and topmost folder scrutinizing functionality.

The modify/write permissions scrutinizing functionality ascertains which first folders, among a first multiplicity of folders in an enterprise computer network, have at least one of modify and write permissions to entities other than IT administration entities, and adds the first folders to a list of base-folder candidates for ownership assignment. The first pruning functionality defines a second multiplicity of folders, which is a subset of the first multiplicity of folders that does not include the first folders, all descendents of the first folders and all ancestors of the first folders.

The permissions scrutinizing functionality ascertains which second folders among the second multiplicity of folders, have permissions to entities other than IT administration entities and adds the second folders to the list of base-folder candidates for ownership assignment. The second pruning functionality defines a third multiplicity of folders which is a subset of the second multiplicity of folders that does not include the second folders, all descendents of the second folders and all ancestors of the second folders.

The topmost folder scrutinizing functionality ascertains which third folders among the third multiplicity of folders are topmost folders and adds the third folders to the list of base-folder candidates for ownership assignment.

The automatic folder ownership assignment system also includes possible ownership assignment functionality for designating possible assignment of ownership of at least one of the list of base-folder candidates.

As shown in FIG. 1, a list of base-folder candidates for ownership assignment is preferably initialized (100). Thereafter, the folder tree of an enterprise computer network is preferably scrutinized (101) to identify a first set of topmost folders, each of which first set having at least one of modify and write permissions to entities other than IT administration entities. Each of the first set of topmost folders is added (102) to the list of base-folder candidates for ownership assignment.

Subsequently, a second folder tree is defined (104) as a subset of the folder tree of the enterprise from which the first set of topmost folders, all descendents of each of the first set of topmost folders and all ancestors of each of the first set of topmost folders are removed. Thereafter, the second folder tree is preferably scrutinized (106) to identify a second set of topmost folders, each of which second set having at least read permissions to entities other than IT administration entities. Each of the second set of topmost folders is added (108) to the list of base-folder candidates for ownership assignment.

Subsequently, a third folder tree is defined (110) as a subset of the second folder tree from which the second set of topmost folders, all descendents of each of the second set of topmost folders and all ancestors of each of the second set of topmost folders are removed. Thereafter, the third folder tree is preferably scrutinized (112) to identify a third set of topmost folders, and each the third set is added (114) to the list of base-folder candidates for ownership assignment.

Thereafter, for each folder in the list of base-folders, the system identifies entities who have been most active with regard to the folder and then recommends (116) that ownership of the folder of all descendent folders thereof be assigned to one of the entities who have been most active with regard to the folder.

Reference is now made to FIG. 2, which is a simplified flowchart indicating steps in the operation of a system for automatic resource ownership assignment, constructed and operative in accordance with another preferred embodiment of the present invention.

The automatic folder ownership assignment system of FIG. 2 is preferably suitable for operating in an enterprise computer network including multiple disparate clients, data storage elements, computer hardware resources and computer software resources, and includes actual modification scrutinizing functionality, first pruning functionality, actual access scrutinizing functionality, second pruning functionality and topmost folder scrutinizing functionality.

The actual modification scrutinizing functionality ascertains which first folders, among a first multiplicity of folders in an enterprise computer network, have been at least actually modified by entities other than IT administration entities, and adds the first folders to a list of base-folder candidates for ownership assignment. The first pruning functionality defines a second multiplicity of folders, which is a subset of the first multiplicity of folders that does not include the first folders, all descendents of the first folders and all ancestors of the first folders.

The actual access scrutinizing functionality ascertains which second folders among the second multiplicity of folders, have been at least actually accessed by entities other than IT administration entities and adds the second folders to the list of base-folder candidates for ownership assignment. The second pruning functionality defines a third multiplicity of folders which is a subset of the second multiplicity of folders that does not include the second folders, all descendents of the second folders and all ancestors of the second folders.

The topmost folder scrutinizing functionality ascertains which third folders among the third multiplicity of folders are topmost folders and adds the third folders to the list of base-folder candidates for ownership assignment.

The automatic folder ownership assignment system also includes possible ownership assignment recommendation functionality for designating possible assignment of ownership of at least one of the list of base-folder candidates.

As shown in FIG. 2, a list of base-folder candidates for ownership assignment is preferably initialized (200). Thereafter, the folder tree of an enterprise computer network is preferably scrutinized (201) to identify a first set of topmost folders, each of which first set having been at least actually modified by entities other than IT administration entities. Each of the first set of topmost folders is added (202) to the list of base-folder candidates for ownership assignment.

Subsequently, a second folder tree is defined (204) as a subset of the folder tree of the enterprise from which the first set of topmost folders, all descendents of each of the first set of topmost folders and all ancestors of each of the first set of topmost folders are removed. Thereafter, the second folder tree is preferably scrutinized (206) to identify a second set of topmost folders, each of which second set having been at least actually accessed by entities other than IT administration entities. Each of the second set of topmost folders is added (208) to the list of base-folder candidates for ownership assignment.

Subsequently, a third folder tree is defined (210) as a subset of the second folder tree from which the second set of topmost folders, all descendents of each of the second set of topmost folders and all ancestors of each of the second set of topmost folders are removed. Thereafter, the third folder tree is preferably scrutinized (212) to identify a third set of topmost folders, and each the third set is added (214) to the list of base-folder candidates for ownership assignment.

Thereafter, for each folder in the list of base-folders, the system identifies entities who have been most active with regard to the folder and then recommends (216) that ownership of the folder of all descendent folders thereof be assigned to one of the entities who have been most active with regard to the folder.

Reference is now made to FIG. 3, which is a simplified flowchart indicating steps in the operation of a system for automatic resource ownership assignment, constructed and operative in accordance with yet another preferred embodiment of the present invention.

The automatic folder ownership assignment system of FIG. 3 is preferably suitable for operating in an enterprise computer network including multiple disparate clients, data storage elements, computer hardware resources and computer software resources, and includes sensitive content scrutinizing functionality, first pruning functionality and topmost folder scrutinizing functionality.

The sensitive content scrutinizing functionality ascertains which first folders, among a first multiplicity of folders in an enterprise computer network, comprise at least sensitive content, and adds the first folders to a list of base-folder candidates for ownership assignment. Sensitive content may be, for example, confidential financial information or confidential personal information. The first pruning functionality defines a second multiplicity of folders, which is a subset of the first multiplicity of folders that does not include the first folders, all descendents of the first folders and all ancestors of the first folders.

The topmost folder scrutinizing functionality ascertains which second folders among the second multiplicity of folders are topmost folders and adds the second folders to the list of base-folder candidates for ownership assignment.

The automatic folder ownership assignment system also includes possible ownership assignment recommendation functionality for designating possible assignment of ownership of at least one of the list of base-folder candidates.

As shown in FIG. 3, a list of base-folder candidates for ownership assignment is initialized (300). Thereafter, the folder tree of an enterprise computer network is preferably scrutinized (301) to identify a first set of topmost folders, each of which first set including sensitive content. Sensitive content may be, for example, confidential financial information or confidential personal information. Each of the first set of topmost folders is added (302) to the list of base-folder candidates for ownership assignment.

Subsequently, a second folder tree is defined (304) as a subset of the folder tree of the enterprise from which the first set of topmost folders, all descendents of each of the first set of topmost folders and all ancestors of each of the first set of topmost folders are removed. Thereafter, the second folder tree is preferably scrutinized (306) to identify a second set of topmost folders, and each the second set is added (308) to the list of base-folder candidates for ownership assignment.

Thereafter, for each folder in the list of base-folders, the system identifies entities who have been most active with regard to the folder and then recommends (310) that ownership of the folder of all descendent folders thereof be assigned to one of the entities who have been most active with regard to the folder.

It will be appreciated by persons skilled in the art that the present invention is not limited by what has been particularly shown and described hereinabove. Rather, the invention also includes various combinations and subcombinations of the features described hereinabove as well as modifications and variations thereof, which would occur to persons skilled in the art upon reading the foregoing and which are not in the prior art.

The invention claimed is:

1. A system for automatic folder ownership assignment in an enterprise computer network, the system comprising at least one computer processor and one memory implementing the following functionalities:

actual modification scrutinizing functionality operative for ascertaining which first folders, among a first multiplicity of folders in an enterprise computer network, have been at least actually modified by entities other than IT administration entities, and adding said first folders to a list of base-folder candidates for ownership assignment;

first pruning functionality operative for defining a second multiplicity of folders, said second multiplicity of folders being a subset of said first multiplicity of folders which does not include said first folders, all descendents of said first folders and all ancestors of said first folders;

actual access scrutinizing functionality operative for ascertaining which second folders among said second multiplicity of folders, have been at least actually read by entities other than IT administration entities and adding said second folders to said list of base-folder candidates for ownership assignment;

second pruning functionality operative for defining a third multiplicity of folders, said third multiplicity of folders being a subset of said second multiplicity of folders which does not include said second folders, all descendents of said second folders and all ancestors of said second folders;

topmost folder scrutinizing functionality operative for ascertaining which third folders among said third multiplicity of folders are topmost folders and adding said third folders to said list of base-folder candidates for ownership assignment; and possible ownership assignment recommendation functionality operative for recommending possible assignment of ownership of at least one of said list of base-folder candidates.

2. A system for automatic folder ownership assignment in an enterprise computer network, the system comprising at least one computer processor and one memory implementing the following functionalities:

actual modification scrutinizing functionality operative for ascertaining which first folders, among a first multiplicity of folders in an enterprise computer network, have been at least actually modified by entities other than IT administration entities and comprise at least sensitive content, and adding said first folders to a list of base-folder candidates for ownership assignment;

first pruning functionality operative for defining a second multiplicity of folders, said second multiplicity of folders being a subset of said first multiplicity of folders which does not include said first folders, all descendents of said first folders and all ancestors of said first folders;

actual access scrutinizing functionality operative for ascertaining which second folders among said second multiplicity of folders, have been at least actually read by entities other than IT administration entities and comprise at least sensitive content, and adding said second folders to said list of base-folder candidates for ownership assignment;

second pruning functionality operative for defining a third multiplicity of folders, said third multiplicity of folders being a subset of said second multiplicity of folders which does not include said second folders, all descendents of said second folders and all ancestors of said second folders;

topmost folder scrutinizing functionality operative for ascertaining which third folders among said third multiplicity of folders are topmost folders and adding said third folders to said list of base-folder candidates for ownership assignment; and possible ownership assignment recommendation functionality operative for recommending possible assignment of ownership of at least one of said list of base-folder candidates.

* * * * *